United States Patent

Perry

[11] Patent Number: 5,823,098
[45] Date of Patent: Oct. 20, 1998

[54] PIE CRUST PROTECTION DEVICE RING

[76] Inventor: Rachel R. Perry, 506 Marill Terrace, North Lauderdale, Fla. 33068

[21] Appl. No.: 963,583

[22] Filed: Nov. 6, 1997

[51] Int. Cl.[6] ............................. A47J 36/00; A47J 37/01; A47J 43/00; A21B 3/13
[52] U.S. Cl. .......................... 99/433; 99/DIG. 15; 99/645
[58] Field of Search ............................. 99/343, 349, 430, 99/431, 432, 433, 437, 645, DIG. 15; 126/39 M, 39 R, 376, 9 B; 220/4.03; 249/169, 172, 135; 426/132, 523; D7/387, 402, 586, 356

[56] References Cited

U.S. PATENT DOCUMENTS

| | | | |
|---|---|---|---|
| D. 303,908 | 10/1989 | Anderson | D7/387 |
| D. 343,548 | 1/1994 | Helfer | D7/387 |
| 830,492 | 9/1906 | Cole | 99/DIG. 15 |
| 1,180,782 | 4/1916 | McLaughlin | 99/433 |
| 2,026,829 | 12/1936 | Ellinger | 99/DIG. 15 |
| 2,288,795 | 7/1942 | Earl | 99/DIG. 15 |
| 2,583,887 | 1/1952 | Schneeweiss | 99/433 X |
| 3,431,836 | 3/1969 | Murrell | 99/433 X |
| 3,728,957 | 4/1973 | Polus | 99/433 |
| 3,951,053 | 4/1976 | Kirkpatrick | 99/433 |
| 4,080,884 | 3/1978 | Terrell | 99/433 |
| 4,228,731 | 10/1980 | Butler | 99/433 |
| 5,456,162 | 10/1995 | Polizzotto | 99/433 |

*Primary Examiner*—Timothy F. Simone

[57] ABSTRACT

A new pie crust protection device ring for preventing peripheral edges of a pie crust from burning. The inventive device includes a circular cover of an aluminum material dimensioned for covering an open top of a pie pan. A peripheral retaining edge is dimensioned for engaging a peripheral edge of the pie pan over the circular cover. The peripheral retaining edge has an opening therein to facilitate placement on the peripheral edge of the pie pan.

5 Claims, 2 Drawing Sheets

PIE CRUST PROTECTION DEVICE RING

BACKGROUND OF THE INVENTION

1. Field of the Invention

The present invention relates to pie crust shields and more particularly pertains to a new pie crust protection device ring for preventing peripheral edges of a pie crust from burning.

2. Description of the Prior Art

The use of pie crust shields is known in the prior art. More specifically, pie crust shields heretofore devised and utilized are known to consist basically of familiar, expected and obvious structural configurations, notwithstanding the myriad of designs encompassed by the crowded prior art which have been developed for the fulfillment of countless objectives and requirements.

Known prior art pie crust shields include U.S. Pat. No. 4,080,884 to Terrell; U.S. Pat. No. Des. 343,548 to Helfer; U.S. Pat. No. Des. 303,908 to Anderson; U.S. Pat. No. 3,951,053 to Kirkpatrick; U.S. Pat. No. 4,228,731 to Butler; and U.S. Pat. No. 3,987,720 to Hill.

While these devices fulfill their respective, particular objectives and requirements, the aforementioned patents do not disclose a new pie crust protection device ring. The inventive device includes a circular cover of an aluminum material dimensioned for covering an open top of a pie pan. A peripheral retaining edge is dimensioned for engaging a peripheral edge of the pie pan over the circular cover. The peripheral retaining edge has an opening therein to facilitate placement on the peripheral edge of the pie pan.

In these respects, the pie crust protection device ring according to the present invention substantially departs from the conventional concepts and designs of the prior art, and in so doing provides an apparatus primarily developed for the purpose of preventing peripheral edges of a pie crust from burning.

SUMMARY OF THE INVENTION

In view of the foregoing disadvantages inherent in the known types of pie crust shields now present in the prior art, the present invention provides a new pie crust protection device ring construction wherein the same can be utilized for preventing peripheral edges of a pie crust from burning.

The general purpose of the present invention, which will be described subsequently in greater detail, is to provide a new pie crust protection device ring apparatus and method which has many of the advantages of the pie crust shields mentioned heretofore and many novel features that result in a new pie crust protection device ring which is not anticipated, rendered obvious, suggested, or even implied by any of the prior art pie crust shields, either alone or in any combination thereof.

To attain this, the present invention generally comprises a circular cover of an aluminum material dimensioned for covering an open top of a pie pan. The circular cover has a radially extending opening. The circular cover has a pair of pliable tabs extending outwardly therefrom on opposing sides of the radially extending opening. A peripheral retaining edge is dimensioned for engaging a peripheral edge of the pie pan over the circular cover. The peripheral retaining edge has an opening therein to facilitate placement on the peripheral edge of the pie pan. The peripheral retaining edge includes an essentially horizontal portion and an essentially vertical portion. A lower edge of the essentially vertical portion has a pair of retaining tabs extending outwardly on opposing sides of the opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pie crust protection device ring apparatus and method which has many of the advantages of the pie crust shields mentioned heretofore and many novel features that result in a new pie crust protection device ring which is not anticipated, rendered obvious, suggested, or even implied by any of the prior art pie crust shields, either alone or in any combination thereof.

It is another object of the present invention to provide a new pie crust protection device ring which may be easily and efficiently manufactured and marketed.

It is a further object of the present invention to provide a new pie crust protection device ring which is of a durable and reliable construction.

An even further object of the present invention is to provide a new pie crust protection device ring which is susceptible of a low cost of manufacture with regard to both materials and labor, and which accordingly is then susceptible of low prices of sale to the consuming public, thereby making such pie crust protection device ring economically available to the buying public.

Still yet another object of the present invention is to provide a new pie crust protection device ring which provides in the apparatuses and methods of the prior art some of the advantages thereof, while simultaneously overcoming some of the disadvantages normally associated therewith.

Still another object of the present invention is to provide a new pie crust protection device ring for preventing peripheral edges of a pie crust from burning.

Yet another object of the present invention is to provide a new pie crust protection device ring which includes a circular cover of an aluminum material dimensioned for covering an open top of a pie pan. A peripheral retaining edge is dimensioned for engaging a peripheral edge of the pie pan over the circular cover. The peripheral retaining edge has an opening therein to facilitate placement on the peripheral edge of the pie pan.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
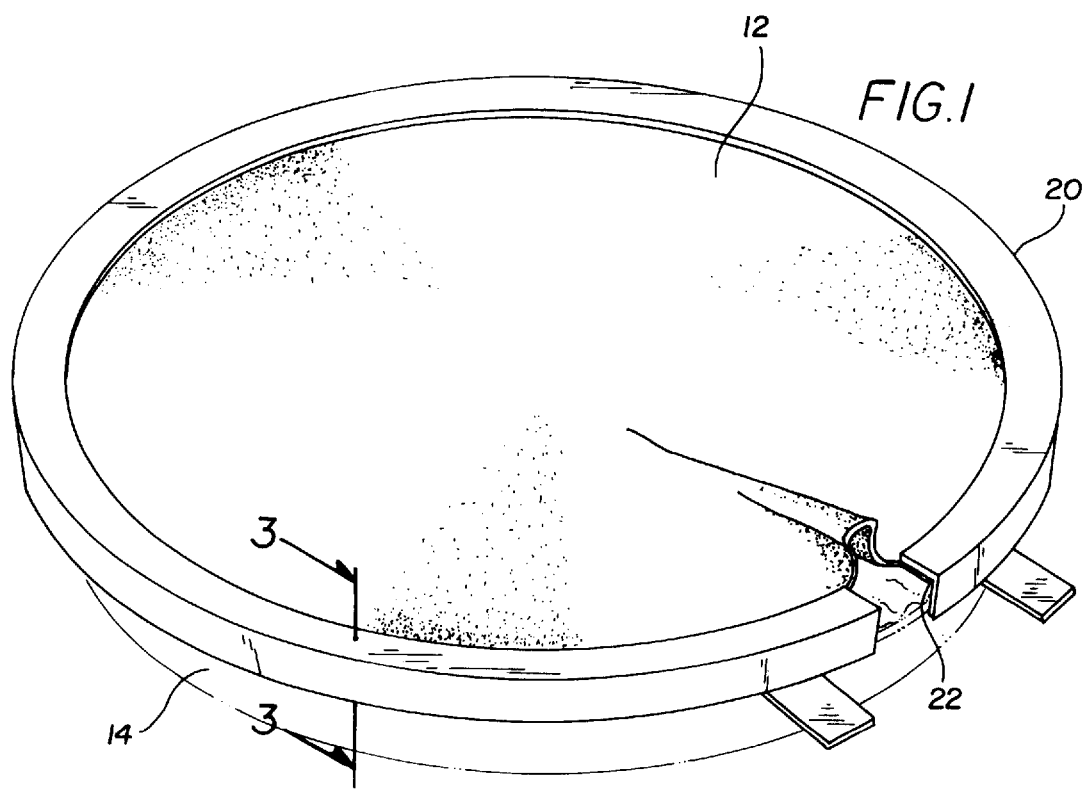
FIG. 1 is a perspective view of a new pie crust protection device ring according to the present invention illustrated in use.
Figure 2:
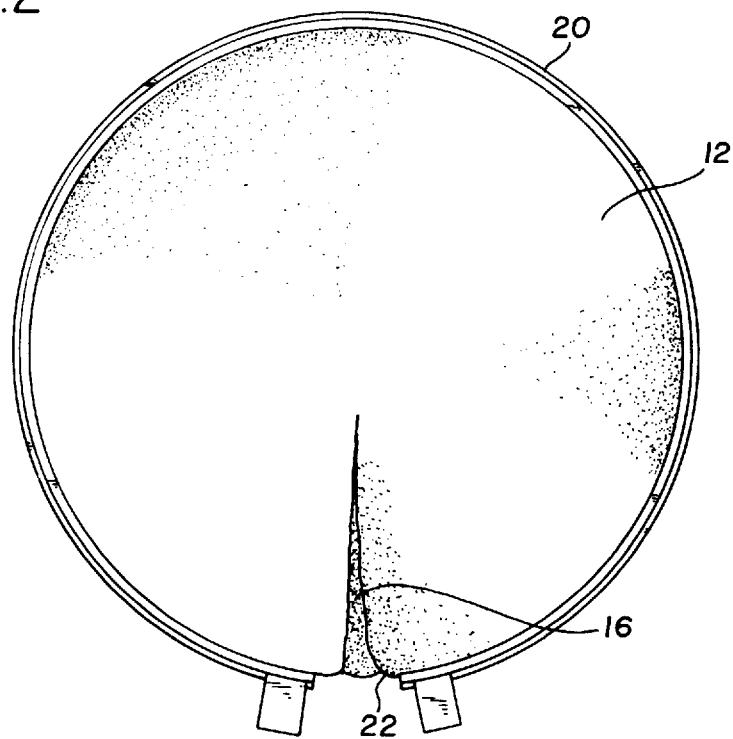
FIG. 2 is a top plan view of the present invention.
Figure 3:
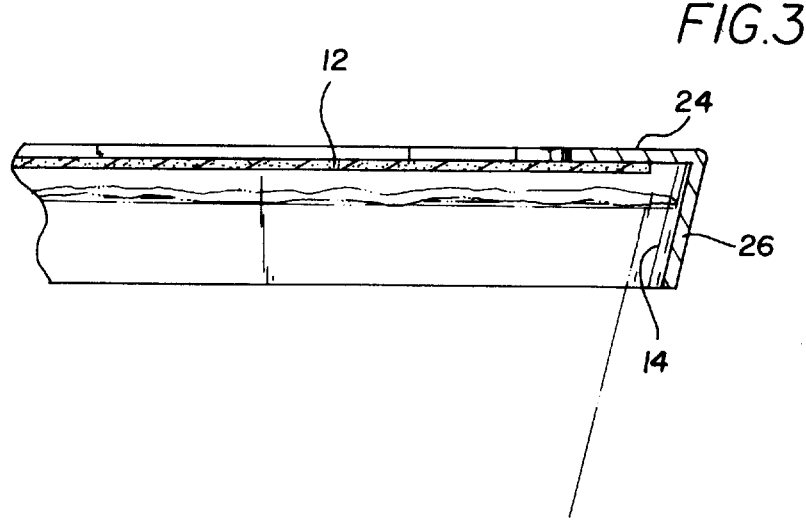
FIG. 3 is a cross-sectional view of the present invention as taken along line 3—3 of FIG. 1.
Figure 4:
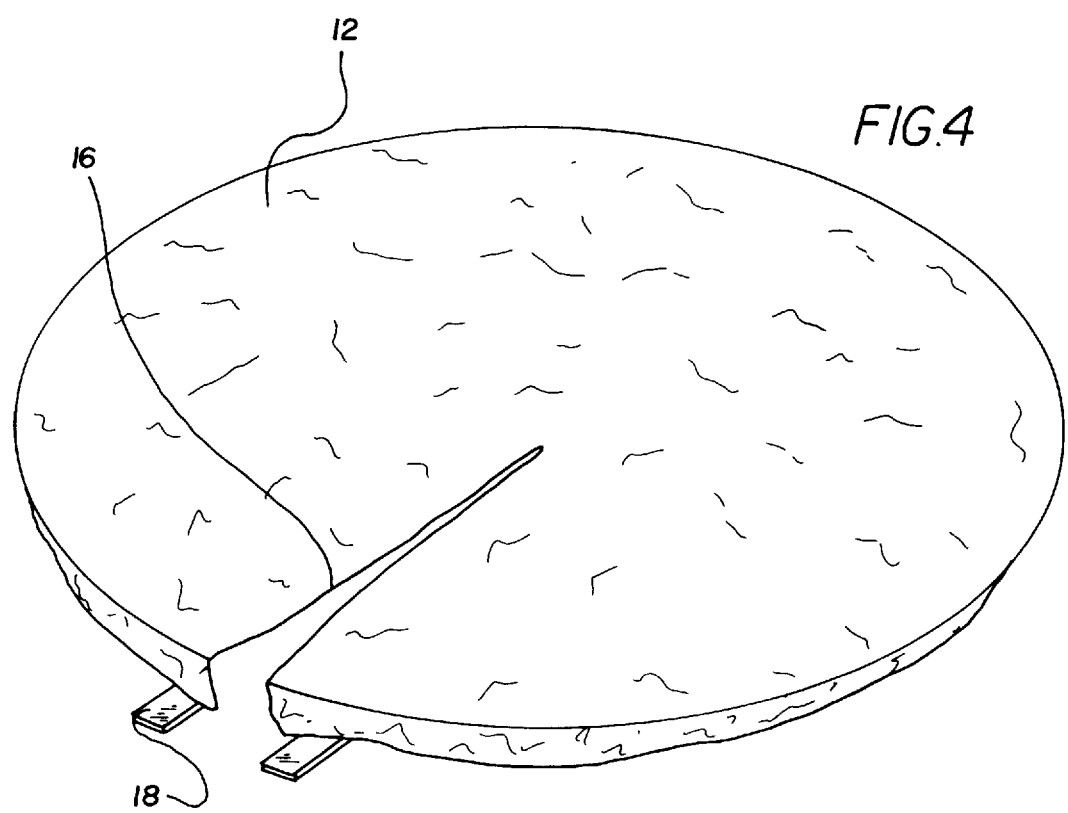
FIG. 4 is a plan perspective view of the circular cover of the present invention.

With reference now to the drawings, and in particular to FIGS. 1 through 4 thereof, a new pie crust protection device ring embodying the principles and concepts of the present invention and generally designated by the reference numeral 10 will be described.

As best illustrated in FIGS. 1 through 4, the pie crust protection device ring 10 comprises a circular cover 12 of an aluminum material dimensioned for covering an open top of a pie pan 14. The circular cover 12 has a radially extending opening 16. The circular cover 12 has a pair of pliable tabs 18 extending outwardly therefrom on opposing sides of the radially extending opening 16.

A peripheral retaining edge 20 is dimensioned for engaging a peripheral edge of the pie pan 14 over the circular cover 12. The peripheral retaining edge 20 has an opening 22 therein to facilitate placement on the peripheral edge of the pie pan 14. The peripheral retaining edge 20 includes an essentially horizontal portion 24 and an essentially vertical portion 26. A lower edge of the essentially vertical portion 26 has a pair of retaining tabs 28 extending outwardly on opposing sides of the opening 22.

In use, after a pie crust has been filled and is prepared for baking, the circular cover 12 is placed over the open top of the pie pan 14 enclosing the pie filling therein. The pliable tabs 18 are then bent downwardly to engage the sides of the pie pan 14. The radially extending opening allows for the cover 12 to expand to cover pie pans of varying diameters. Once the circular cover 12 is in place, the peripheral retaining edge 20 is positioned over the circular cover 12 and engaged to the peripheral edge of the pie pan 14. The pair of retaining tabs 28 are then bent downwardly to engage the sides of the pie pan 14. The pie pan 14 is then ready for placement within an oven for baking.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new pie crust protection device ring for preventing peripheral edges of a pie crust from burning comprising, in combination:

a circular cover of an aluminum material dimensioned for covering an open top of a pie pan, the circular cover having a radially extending opening, the circular cover having a pair of pliable tabs extending outwardly therefrom on opposing sides of the radially extending opening;

a peripheral retaining edge dimensioned for engaging a peripheral edge of the pie pan over the circular cover, the peripheral retaining edge having an opening therein to facilitate placement on the peripheral edge of the pie pan, the peripheral retaining edge including an essentially horizontal portion and an essentially vertical portion, a lower edge of the essentially vertical portion having a pair of retaining tabs extending outwardly on opposing sides of the opening.

2. A new pie crust protection device comprising, in combination:

a circular cover of an aluminum material dimensioned for covering an open top of a pie pan; and a peripheral retaining edge dimensioned for engaging a peripheral edge of the pie pan over the circular cover, the peripheral retaining edge having an opening therein to facilitate placement on the peripheral edge of the pie pan.

3. The pie crust protection device as set forth in claim 2 wherein the circular cover has a radially extending opening.

4. The pie crust protection device as set forth in claim 3 wherein the circular cover has a pair of pliable tabs extending outwardly therefrom on opposing sides of the radially extending opening.

5. The pie crust protection device as set forth in claim 2 wherein the peripheral retaining edge includes an essentially horizontal portion and an essentially vertical portion, a lower edge of the essentially vertical portion having a pair of retaining tabs extending outwardly on opposing sides of the opening.

* * * * *